(12) United States Patent
Elison et al.

(10) Patent No.: US 12,294,103 B2
(45) Date of Patent: *May 6, 2025

(54) VALVE ASSEMBLY FOR A BATTERY COVER

(71) Applicant: CPS Technology Holdings LLC, New York, NY (US)

(72) Inventors: Nicholas E. Elison, Mequon, WI (US); Dale B. Trester, Waukesha, WI (US); Arunraj Varatharajah, Menomonee Falls, WI (US)

(73) Assignee: CPS Technology Holdings LLC, New York, NY (US)

(*) Notice: Subject to any disclaimer, the term of this patent is extended or adjusted under 35 U.S.C. 154(b) by 506 days.

This patent is subject to a terminal disclaimer.

(21) Appl. No.: 17/688,472

(22) Filed: Mar. 7, 2022

(65) Prior Publication Data

US 2022/0190433 A1    Jun. 16, 2022

Related U.S. Application Data

(63) Continuation of application No. 16/471,277, filed as application No. PCT/US2017/067913 on Dec. 21, 2017, now Pat. No. 11,289,767.

(60) Provisional application No. 62/438,233, filed on Dec. 22, 2016.

(51) Int. Cl.
*H01M 50/30* (2021.01)
*H01M 50/147* (2021.01)

(52) U.S. Cl.
CPC ......... *H01M 50/30* (2021.01); *H01M 50/147* (2021.01)

(58) Field of Classification Search
None
See application file for complete search history.

(56) References Cited

U.S. PATENT DOCUMENTS

| | | |
|---|---|---|
| 3,860,453 A | 1/1975 | Schmidt |
| 3,994,749 A | 11/1976 | Decker et al. |
| 4,052,534 A * | 10/1977 | Devitt ................. H01M 50/308 |
| | | 429/89 |
| 4,271,241 A | 6/1981 | Hooke et al. |
| 4,328,290 A | 5/1982 | Szymborski et al. |
| 4,346,151 A | 8/1982 | Uba et al. |
| 4,383,011 A | 5/1983 | McClelland et al. |
| 4,444,853 A | 4/1984 | Halsall et al. |
| 4,576,879 A | 3/1986 | Nakazawa et al. |
| 4,613,550 A | 9/1986 | Jergl et al. |
| 4,780,378 A | 10/1988 | McCartney et al. |
| 4,891,270 A | 1/1990 | Jergl et al. |
| 5,258,243 A | 11/1993 | Cannone |
| 5,284,720 A | 2/1994 | Thuerk et al. |
| 5,554,455 A | 9/1996 | Inoue et al. |
| 5,856,037 A | 1/1999 | Casale et al. |
| 5,981,099 A | 11/1999 | Bourbeau |

(Continued)

FOREIGN PATENT DOCUMENTS

| | | |
|---|---|---|
| CN | 2622872 Y | 6/2004 |
| CN | 201820846 U | 5/2011 |

(Continued)

*Primary Examiner* — Zhongqing Wei
(74) *Attorney, Agent, or Firm* — Boardman & Clark LLP

(57) ABSTRACT

A valve assembly for a battery cover is provided. The valve assembly may advantageously allow for testing prior to installation on a battery cover. A battery is also provided.

20 Claims, 16 Drawing Sheets

(56) References Cited

U.S. PATENT DOCUMENTS

| | | |
|---|---|---|
| 6,068,945 A | 5/2000 | Moll |
| 6,110,617 A | 8/2000 | Feres |
| 6,218,045 B1 | 4/2001 | Ide et al. |
| 6,255,013 B1 | 7/2001 | Marukawa et al. |
| 6,368,741 B1 | 4/2002 | Hackel et al. |
| 6,376,119 B1 | 4/2002 | Nann et al. |
| 6,461,758 B1 | 10/2002 | Geibl et al. |
| 6,528,202 B1 | 3/2003 | Arai et al. |
| 6,579,640 B1 | 6/2003 | Nagase et al. |
| 6,844,104 B2 | 1/2005 | Cramer et al. |
| 6,881,513 B2 | 4/2005 | Dasgupta et al. |
| 6,949,310 B2 | 9/2005 | Phillips |
| 7,951,475 B2 | 5/2011 | Imhof et al. |
| 8,003,242 B2 | 8/2011 | Puhlick et al. |
| 8,528,773 B2 | 9/2013 | Streuer |
| 8,663,824 B1 | 3/2014 | Frey et al. |
| 8,722,241 B2 | 5/2014 | Mizuta et al. |
| 8,960,320 B2 | 2/2015 | Moyer |
| 8,980,455 B2 | 3/2015 | Guo |
| 9,353,879 B2 | 5/2016 | Jones et al. |
| 9,461,287 B2 | 10/2016 | Doyle |
| 9,751,474 B2 | 9/2017 | Meyer et al. |
| 2002/0094473 A1 | 7/2002 | Lin |
| 2004/0185339 A1 | 9/2004 | Jones |
| 2006/0141342 A1 | 6/2006 | Marconi et al. |
| 2009/0061290 A1 | 3/2009 | Anazi et al. |
| 2011/0262782 A1 | 10/2011 | Zhu et al. |
| 2013/0071708 A1 | 3/2013 | Delans |
| 2013/0302656 A1 | 11/2013 | Partington et al. |
| 2015/0030893 A1 | 1/2015 | Mack et al. |
| 2016/0093842 A1 | 3/2016 | Blanco et al. |
| 2016/0126517 A1 | 5/2016 | Koch et al. |

FOREIGN PATENT DOCUMENTS

| | | |
|---|---|---|
| DE | 19953417 A1 | 5/2001 |
| DE | 199534117 A1 | 5/2001 |
| DE | 102013213776 A1 | 1/2015 |
| EP | 0794582 A1 | 9/1997 |
| EP | 1091430 A2 | 4/2001 |
| EP | 1055263 B1 | 4/2006 |
| EP | 1689010 B1 | 8/2008 |
| EP | 1732151 B1 | 3/2011 |
| EP | 2820692 B1 | 6/2016 |
| FR | 2551172 A1 | 3/1985 |
| GB | 2086646 A | 5/1982 |
| JP | 2974989 B2 | 11/1999 |
| JP | 2003132866 A | 5/2003 |
| JP | 4622019 | 2/2011 |
| JP | 4701636 B2 | 6/2011 |
| JP | 5591141 B2 | 9/2014 |
| WO | 9627215 A1 | 9/1996 |
| WO | 2005022680 A3 | 3/2005 |
| WO | 201401545 A1 | 1/2014 |

\* cited by examiner

SECTION C-C

SECTION D-D

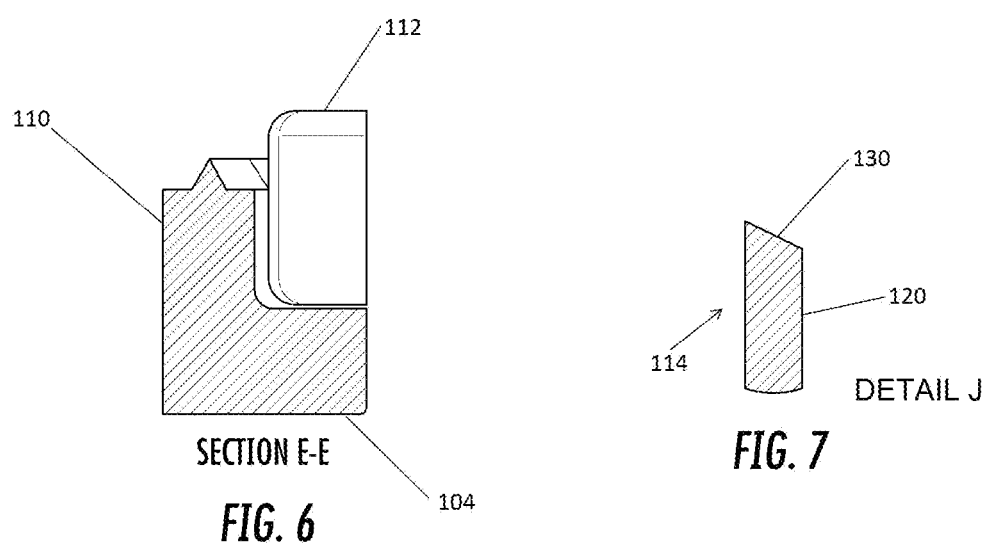
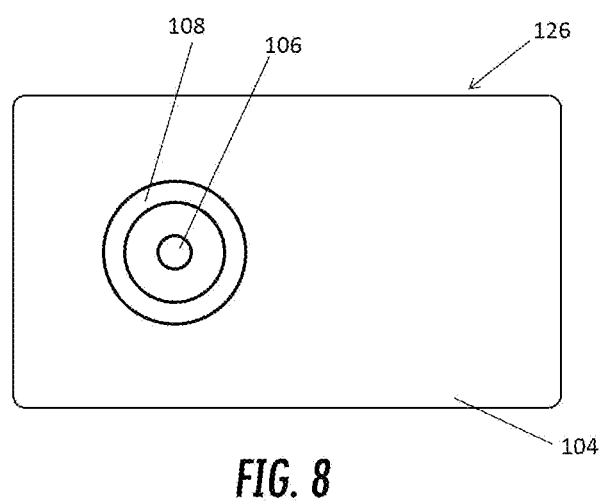

SECTION A-A

SECTION B-B

ISO TOP

ISO BOTTOM

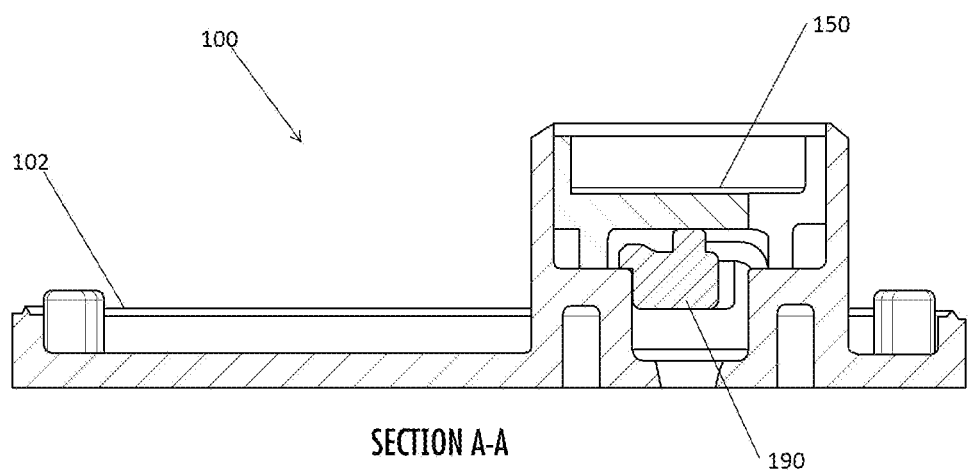
FIG. 17
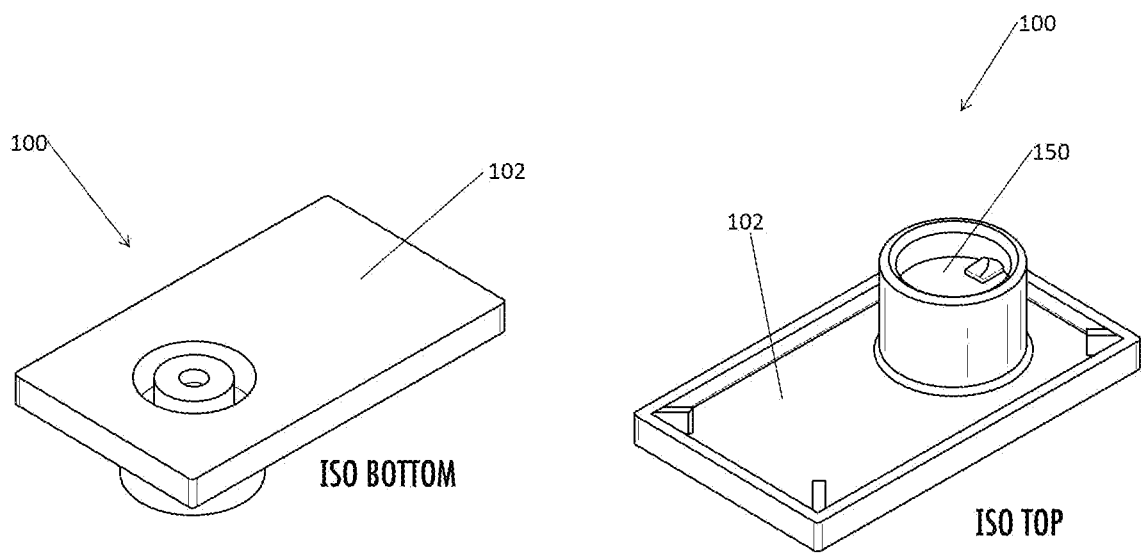
FIG. 18
FIG. 19

VALVE ASSEMBLY FOR A BATTERY COVER

CROSS-REFERENCE TO RELATED APPLICATIONS

This application is a continuation of U.S. application Ser. No. 16/471,277, entitled "VALVE ASSEMBLY FOR A BATTERY COVER", having a 371(c) date of Jun. 19, 2019; which is a 371 of International Application No. PCT/US17/67913, entitled "VALVE ASSEMBLY FOR A BATTER COVER". filed Dec. 21, 2017; which claims the benefit of U.S. Application No. 62/438,233, entitled "VALVE ASSEMBLY FOR A BATTER COVER", filed Dec. 22, 2016, the entire contents of which are hereby incorporated by reference in their entirety herein.

BACKGROUND

Batteries are commonly provided with a mechanism for venting gases generated during the electrochemical reactions which take place in the battery. One known solution for venting gases in lead-acid batteries (which may include valve regulated lead acid or VRLA batteries) is the battery vent cap or valve assembly. Vent cap or valve assemblies are typically integrated into a battery housing cover, which is then provided onto a battery housing. During charging and discharging of the battery, gases need to be expelled or exhausted from the battery to prevent undesirable buildup. Example gasses exhausted include hydrogen when the battery is new, and hydrogen and oxygen as the battery ages. While venting systems are known, these systems have various disadvantages.

Known valve assemblies may be assembled in a battery cover. Problems with the valve assembly may occur, for example, improper seating of the valve, improper functioning of the valve, or improper positioning of the valve holder or cover. These troubles may result in problems with leaking, pressure, and sparking abnormalities. A faulty valve assembly may lead to battery failure.

By requiring installation into the battery cover, known valve assemblies may not be identified as defective until production of the battery. Without testing, problems with the valve assembly may not be identified. Instead, problems with the valve assembly may result in battery failure as gasses fail to vent properly.

SUMMARY OF THE INVENTION

Therefore, the disclosed valve assembly seeks to remedy disadvantages of known valve assemblies. In various embodiments, the disclosed valve assembly may allow for testing of valve assembly functionality prior to installation in the battery cover. This may allow for identification of possible issues before installation into a battery (before possible battery failure or shortened battery life). In addition, the disclosed valve assembly may allow for optimization of the valve pressure. The disclosed valve assembly may also be used across a range of lead-acid battery types. The disclosed valve assembly may also allow for controlled valve compression variance. Valve compression variance may advantageously allow for increase in valve opening pressure, valve closing pressure, and leak tightness.

The disclosed valve assembly may generally be comprised, in various embodiments, of three parts: valve cover, valve and valve holder. In one or more examples of embodiments, the valve holder and valve cover may be heat welded or ultrasonically welded. The assembled valve assembly may be tested prior to installation in a battery cover.

Disclosed herein is a valve assembly which may comprise: a valve cover having a base coupled to a cylindrical projection and having an aperture with a first radius, wherein the cylindrical projection has an internal surface, the internal surface defining an internal chamber and a second and third radius, wherein the aperture is in fluid communication with the internal chamber of the cylindrical projection; a valve holder provided within the cylindrical projection of the valve cover; and a valve provided between the valve holder and valve cover; wherein the valve assembly may be tested prior to installation on the battery cover. The disclosed valve assembly may further comprise wherein the valve cover is in communication with the internal surface in an area of the cylindrical projection having the third radius. The disclosed valve assembly may further comprise wherein the base further defines a circumferential depression. The disclosed valve assembly may further comprise, wherein the valve holder comprises a base having a first side and a second side opposite the first side, wherein the base is coupled to the cylindrical body on the first side, and the base is coupled to the cylindrical projection on the second side.

Disclosed herein is a valve assembly for a battery cover which may comprise: a valve cover having a base with an aperture having a first radius in fluid communication with an internal chamber defined by a cylindrical projection coupled to the base, the cylindrical projection having a second internal radius and a third internal radius, wherein the first radius is smaller than the second radius, which is smaller than the third radius; a valve provided in the internal chamber; and a valve holder provided in the internal chamber in a region of the internal chamber having the third internal radius. The disclosed valve assembly may further comprise wherein the base features a circumferential depression. The disclosed valve assembly may further comprise wherein the aperture is provided in the approximate center of the circumferential depression.

The disclosed valve assembly, in various embodiments, may be tested prior to installation on a battery cover. The disclosed valve assembly may be installed into a battery cover. The disclosed battery may be provided into a battery.

Also disclosed is a battery comprising: a housing having operable battery elements; a battery cover on the housing having a recess sized to accept a valve assembly; a valve assembly having a valve cover, valve, and valve holder; wherein the valve cover features a base having a cylindrical projection and an aperture, the aperture having a first radius in fluid communication with an internal chamber defined by the cylindrical projection, the cylindrical projection having a second internal radius and a third internal radius; and wherein the valve cover and valve are provided within the internal chamber. The valve assembly may further comprise wherein the first radius is smaller than the second radius, which is smaller than the third radius. The valve assembly may further comprise wherein the valve holder is provided in a section of the valve cover internal chamber having the third radius. The valve assembly may further comprise wherein the valve is provided between the valve holder and the cylindrical projection. The valve assembly may further comprise wherein the valve is positioned between the valve holder and the cylindrical projection in the internal chamber in an area having the third radius. The valve assembly may further comprise wherein a portion of the valve extends into an area in the internal chamber having a second radius. The valve assembly may further comprise wherein the base has a circumferential depression. The valve assembly may further comprise wherein the aperture is approximately in the center of the circumferential depression.

Further features and advantages may be understood from the figures and description provided herein.

BRIEF DESCRIPTION OF THE FIGURES

FIG. 6 is a third detail perspective of a valve cover, according to various embodiments.

FIG. 7 is a fourth detail perspective of a valve cover, according to various embodiments.

FIG. 8 is a bottom view of a valve cover, according to various embodiments.

FIG. 17 shows a. cross-section of the valve assembly of FIG. 16.

FIG. 18 shows a bottom isometric view of a valve assembly, according to various embodiments.

FIG. 19 shows a top isometric view of a valve assembly, according to various embodiments.

It should be understood that the drawings are not necessarily to scale. In certain instances, details that are not necessary to the understanding of the invention or render other details difficult to perceive may have been omitted. It should be understood, of course, that the invention is not necessarily limited to the particular embodiments illustrated herein.

DESCRIPTION OF THE INVENTION

The valve assembly 100 may, in various embodiments, be generally comprised of three parts: a valve cover 102, valve 190, and valve holder 150. Referring to the Figures, a valve assembly 100 according to various embodiments and its parts are disclosed.

Valve Cover

Figure 1:
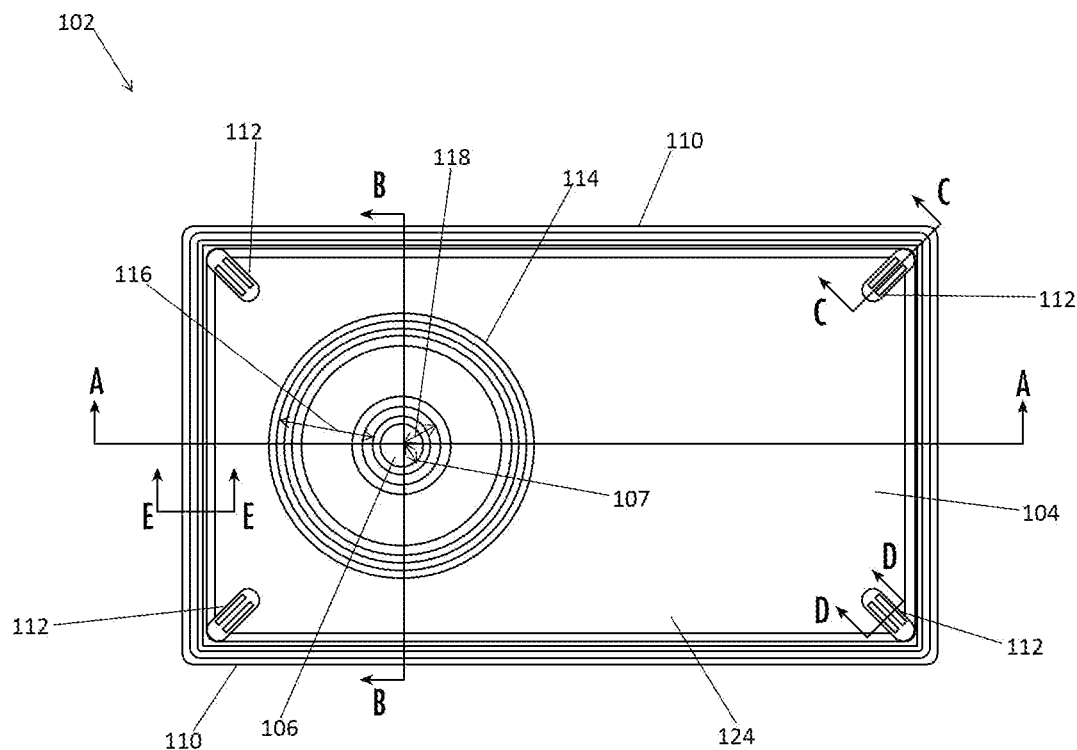
FIG. 1 is a top view of a valve cover, according to various embodiments.

Referring to FIGS. 1-10, a valve cover 102 is disclosed, according to various embodiments. FIG. 1 shows a first view of the valve cover 102. The valve cover 102 may be generally rectangular in shape, according to various embodiments. The valve cover 102 may have a generally rectangular base 104. The valve cover 102 may have a cylindrical projection 114 extending from the base 104 with a narrower internal radius at the base leading to a wider internal radius towards the top. It is noted that while specific geometries are disclosed for purposes of example—for example, the projection as "cylindrical"—variations thereon (e.g., oval, rectangular, polygonal, triangular, or any shapes formed of straight sides, non-straight sides, or combinations of the two) would not depart from the overall scope of the present invention. The base 104 may include a base first side 124. The base may include an aperture 106 having a first radius 107, the aperture being in fluid communication with a second radius 118 and third radius 116 in the cylindrical projection 114. The base 104 may include a number of projections 112 in each corner of the valve cover 102 as well as raised sides 110.

Figure 2:
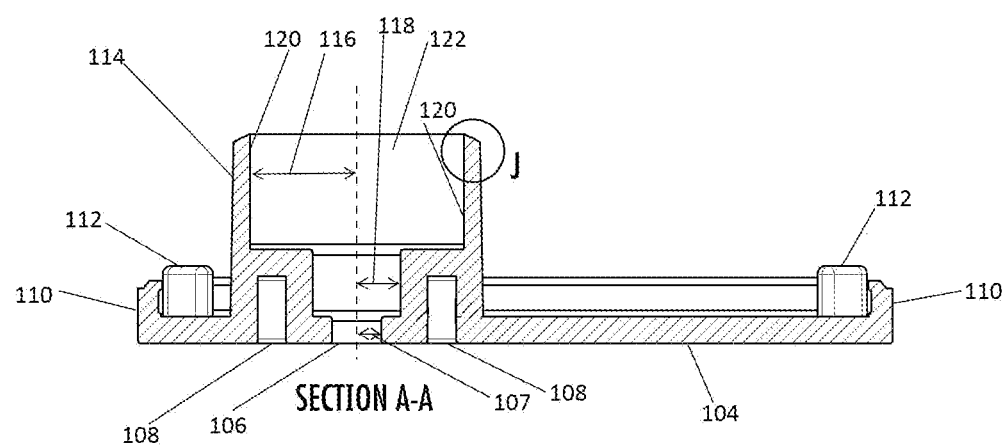
FIG. 2 is a first cross-section of a valve cover, according to various embodiments.

FIG. 2 illustrates a section of the valve cover 102 taken along line A-A of FIG. 1. The cylindrical projection 114 may define an open space or internal chamber 122. The cylindrical projection 114 may include an internal wall surface 120 surrounding the internal chamber 122. The shape of the internal chamber 122 of the cylindrical projection 114 may be defined first by a first aperture 106 in the base 104 having a first internal radius 107, a second internal radius 118 provided in a region above the first aperture 1.06, and a third internal radius 116 provided in an area above the area defined by the second internal radius 118. The first aperture 106 may be surrounded by a circumferential depression 108 provided in the base 104. The base 104 may likewise include raised sides 110 and projections 112.

The center of the cylindrical projection 114 may be open; that is, a first aperture 106 may be provided in the base 104 of the valve cover 102 allowing for fluid communication from the first aperture 106 out a top of the cylindrical projection 114. One or more additional apertures may be provided around the center of the circumferential projection 114. These apertures, in various embodiments, may be ring-shaped (other shapes such as rectangles, polygons, etc., contiguous and non-contiguous arcs or lines, etc. may be considered as within the scope of this disclosure) such as the circumferential depression 108. The aperture and/or circumferential depression 108 according to various embodiments may be seen further in FIG. 10. It should be understood that while the term aperture may be used, in various embodiments, the feature may be a depression; that is, it may not be open.

Figure 3:
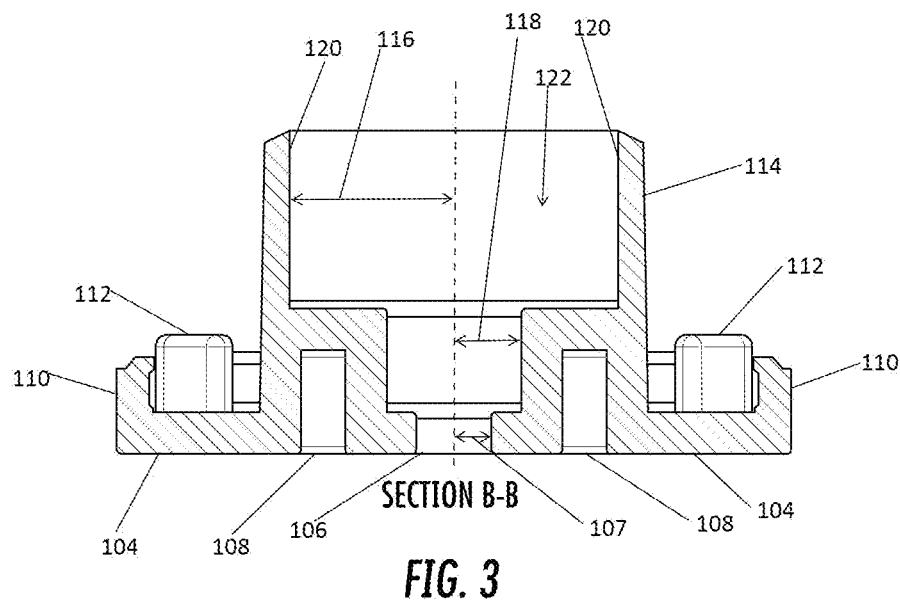
FIG. 3 is a second cross-section of a valve cover, according to various embodiments.

The circumferential depression 108 may be seen further in FIG. 3. The valve cover 102 may have raised sides 110. In addition, the valve cover 102 may have projections 112 disposed in each corner. The projections 112 may, in various embodiments, be disposed of at a forty-five degree angle relative to the sides of the valve cover 102. FIG. 3 also shows the cylindrical projection 114 and first aperture 106 defining an internal volume having a first internal radius 107, second internal radius 118, and third internal radius 116. The third internal radius 116 is larger than the second internal radius 118 which is larger than the first internal radius 107.

FIG. 3 shows a section of the valve cover 102 taken along line B-B of FIG. 1. The cylindrical projection 114 may be seen in cross-section. The cylindrical projection 114 may have a second internal radius 118 and third internal radius 116. The third internal radius 116 may be seen near the top of the cylindrical projection 114, while the second internal radius 118 may be found in approximately the bottom half of the cylindrical projection 114. A first internal radius 107 may be found in the base of the valve cover 102. Further detail regarding the first internal radius 107 may be seen in FIG. 10.

Figure 4:
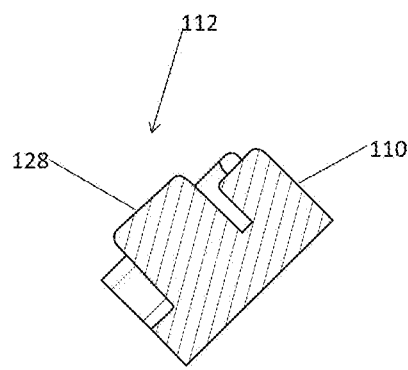
FIG. 4 is a detail perspective of a valve cover, according to various embodiments.
Figure 5:
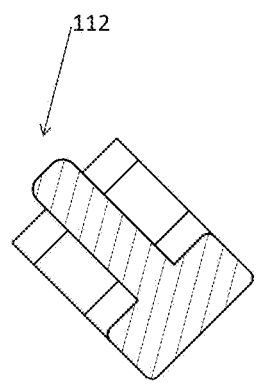
FIG. 5 is a second detail perspective of a valve cover, according to various embodiments.

FIG. 4 shows a detail view taken along line C-C of FIG. 1. This detail view shows a corner projection 112 having, in various embodiments, a square top 128 (again, while specific geometries are disclosed for purposes of example, variations thereon (e.g., oval, circular, triangular, polygonal) would not depart from the overall scope of the present invention). Likewise, a detailed view of a raised side 110 is shown. Similarly, FIG. 5 shows another detail view of the valve cover 102 taken along line D-D of FIG. 1. The projection 112 of FIG. 5 is relatively narrower than the section of FIG. 4.

FIG. 6 shows another detail view of the valve cover 102 taken along line E-E of FIG. 1. This line may be understood to be taken through the raised side 110 of the valve cover 102. The valve cover 102 sides may be, in various embodiments, a wall. The wall may be shaped as shown in FIG. 6 or shaped according to another variation (e.g., flat, rounded, oval, circular, polygonal, straight, rounded, or combinations of straight and rounded) that may not depart from the overall scope of the present invention.

FIG. 7 shows another detail view of the valve cover 102 taken along detail J shown in FIG. 2. This may be understood as a detailed view of a top of the cylindrical projection 114. The internal surface 120 of the cylindrical projection 114 may be seen. In various embodiments, the top of the circumferential projection may be formed at an angle (angled top 130).

FIG. 8 shows a bottom view of the valve cover 102, according to various embodiments. The bottom of the valve cover 102 may feature a base 104 having a base second side 126. The circumferential depression 108 and first aperture 106 may also be seen.

Figure 9:
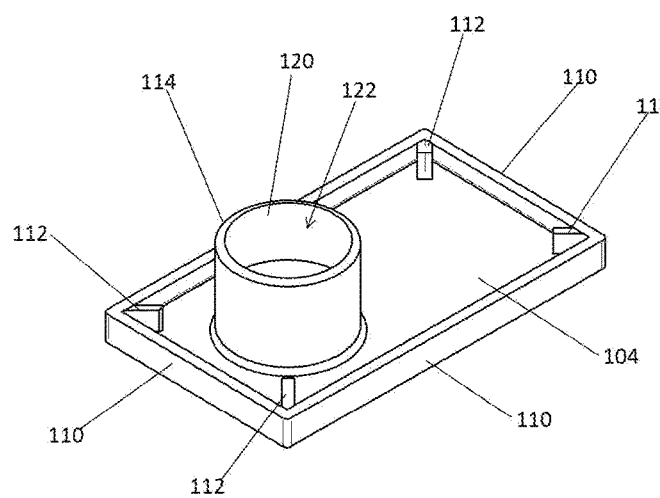
FIG. 9 is a first oblique view of a valve cover, according to various embodiments.
Figure 10:
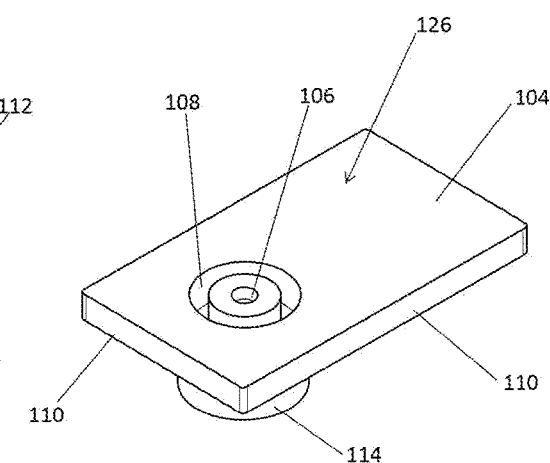
FIG. 10 is a second oblique view of a valve cover, according to various embodiments.

FIG. 9 shows a top isometric view of the valve cover 102. The base 104 having a base first side 124 may be seen. Projections 112 and raised sides 110 may be seen extending from the base 104 in addition to the cylindrical projection 114. FIG. 10 shows an isometric view of the bottom of the valve cover 102. The base 104 featuring a base second side 126 may be seen, along with the circumferential depression 108 and aperture 106.

Valve Holder

A valve holder 150 may be seen, in various embodiments, in FIGS. 11-15. As can be seen in the Figures, the valve holder 150 may have a body 154 that is generally cylindrical in shape (while specific geometries (i.e. cylindrical) are disclosed for purposes of example, other shapes or variations thereon would not depart from the overall scope of the present invention), with a circular base 152. The holder 150 may include a cylindrical projection 156 extending from the base 152 that has a side cutout 158 (again, while specific geometries (i.e. cylindrical) are disclosed for purposes of example, other shapes or variations thereon would not depart from the overall scope of the present invention). A top view of the valve holder 150 featuring a base first side 160 may be seen in FIG. 11. The cutout 158 provided in the base 152 may be seen in the bottom of the top view of FIG. 11.

Figure 11:
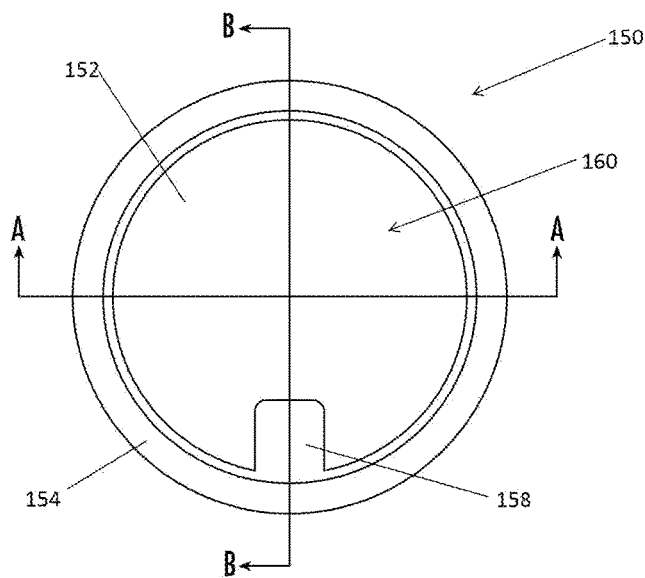
FIG. 11 is a top view of a valve holder, according to various embodiments.
Figure 12:
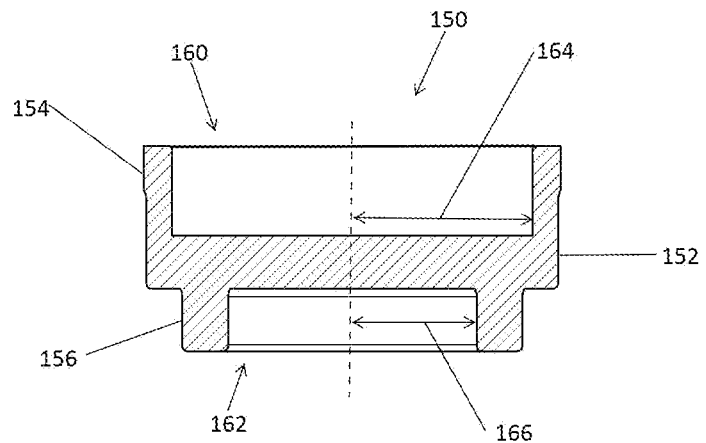
FIG. 12 is a cross-section of a valve holder, according to various embodiments.

A first cross-section of the valve holder 150 taken along line A-A of FIG. 11 may be seen in FIG. 12. As can be seen, the cylindrical projection 156 may have a smaller radius (second radius 166) than a radius (first radius 164) of the cylindrical body 154.

Figure 13:
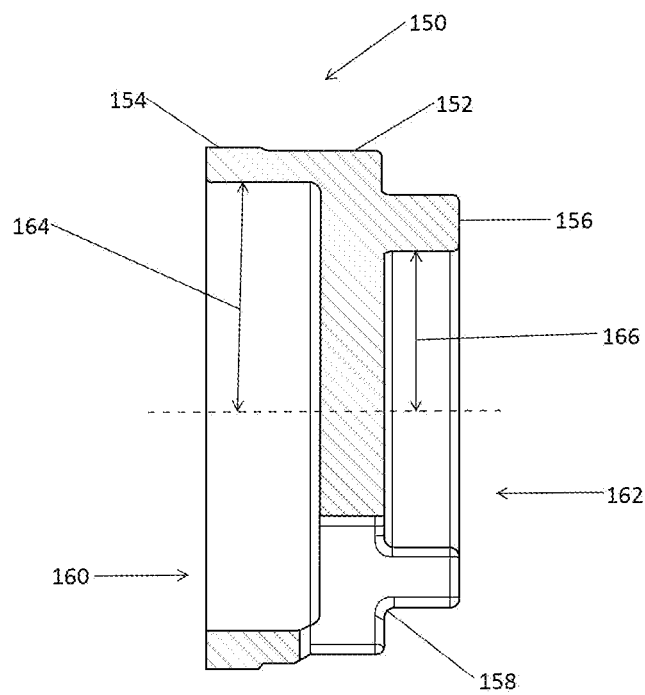
FIG. 13 is a second cross-section of a valve holder, according to various embodiments.

A second cross-section taken along line B-B of FIG. 11 can be seen in FIG. 13. The cylindrical projection 156, base 152, and cylindrical body 154 can be seen, as well as the cutout 158. The cylindrical body 154 may have a first radius 164, while the cylindrical projection 156 may have a second radius 166. The cylindrical projection 156 may be provided on a second side 162 of the valve holder 150, while the cylindrical body 154 may be provided on the first side 160 of the valve holder 150. The cutout 158 may be understood to be provided in the base 152 as well as the cylindrical projection 156.

Figure 14:
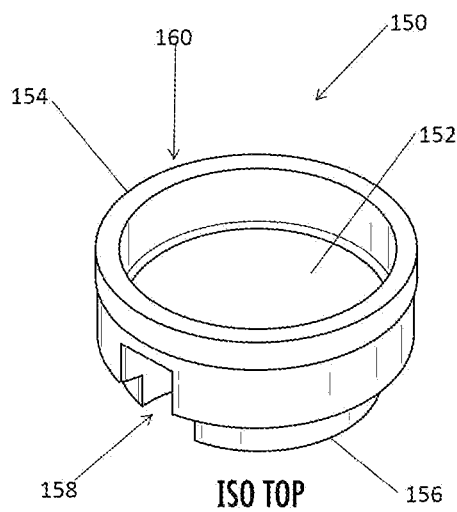
FIG. 14 is a top oblique view of a valve holder, according to various embodiments.

FIG. 14 shows a side top view of the valve holder 150. This view shows the cylindrical body 154 extending upwards from a top side of the base 152 while the cylindrical projection 156 and cutout 158 are provided in a bottom side of the base 152.

Figure 15:
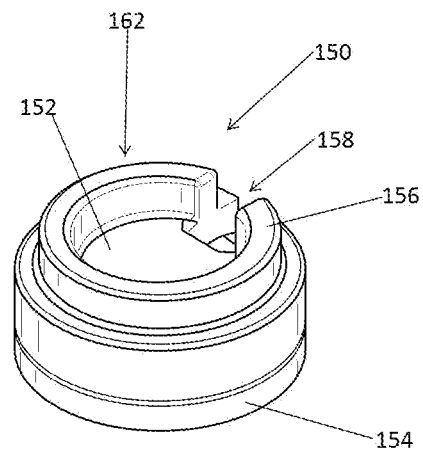
FIG. 15 is a bottom oblique view of a valve holder, according to various embodiments.

FIG. 15 shows a side bottom view of the valve holder 150. This view shows the cylindrical projection 156 extending upwards from a back side of the base, with the cutout 158 provided both in the cylindrical projection 156 and the base 152.

Valve

The valve 190 may be a one-way flap valve, a Bunsen valve, a diaphragm, an umbrella valve, a Belleville valve, a dome valve, and/or any other style of one-way valve, or other like mechanism. The valve 190 may be a one-time pressure release valve. In various embodiments, the valve 190 may have or provide an optimized opening and closing pressure or operating range. In various embodiments, the operating range may be optimized by the valve and the way the valve is provided or oriented within the valve assembly 100. Preferably, the valve 190 is provided with an operating range suitable for the intended purpose of the valve or suitable for the type of battery on which it is used. In various embodiments, the valve may operate in a range of approximately 2 PSI to approximately 10 PSI. The valve 190 and valve assembly 100 may be functional with a variety of battery types and grid geometries, for example, prismatic or coil-wound style battery. The valve 190 may be inserted into the valve holder 150 and secured in place, for example, through insertion into the valve cover 102 to form valve assembly 100.

Valve Assembly

Figure 16:
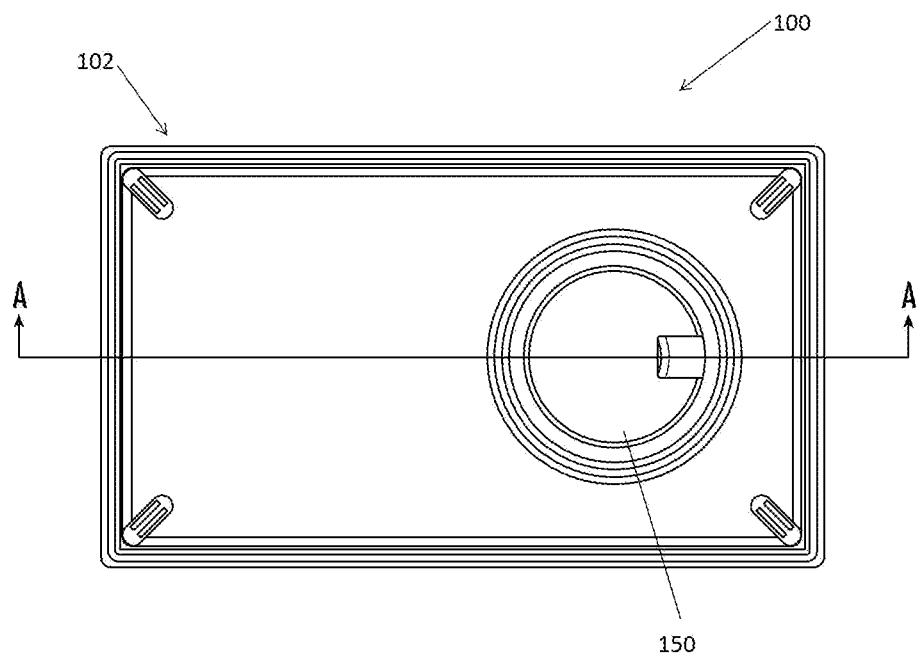
FIG. 16 shows a top view of a valve assembly, according to various embodiments.
Figure 20:
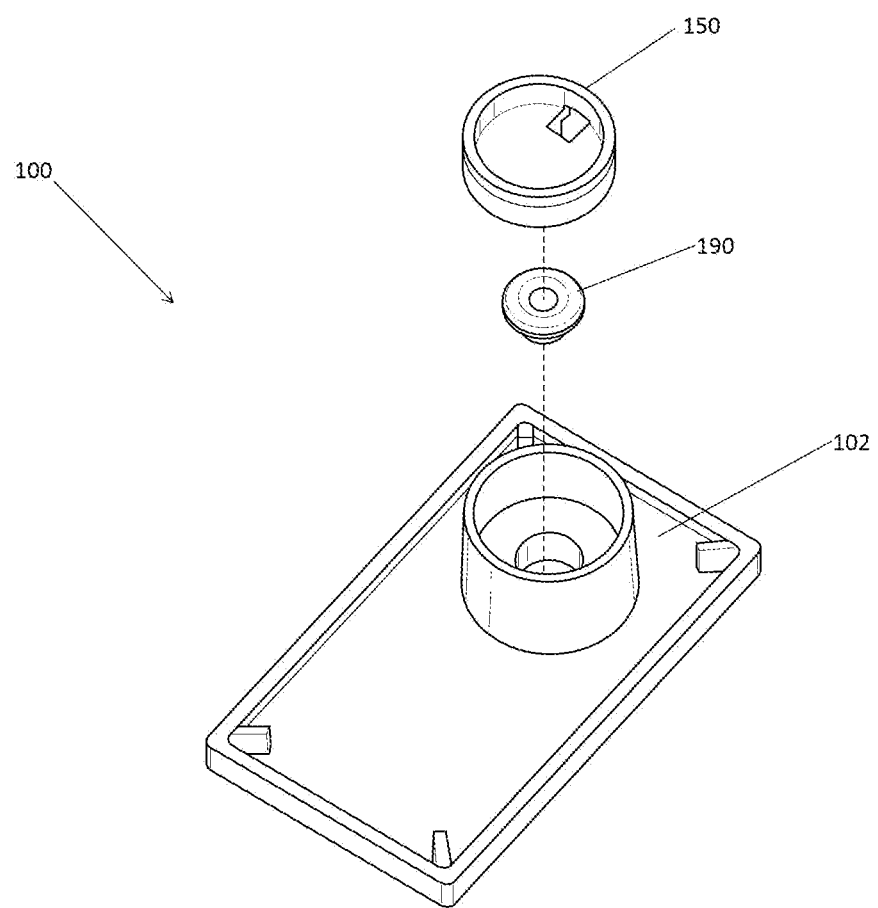
FIG. 20 shows the assembly of a valve assembly, according to various embodiments.

A full assembly including the valve cover 102, valve holder 150, and valve 190 may be seen in FIGS. 16-20. FIG. 16 shows a top view of an assembled valve assembly 100, according to various embodiments. The valve holder 150 having a valve holder first side 160 can be seen inside the cylindrical projection 112 of the valve cover 102. Looking to FIG. 17, which is a view of the valve assembly 100 of FIG. 16 taken along line A-A, the valve cover 102, valve holder 150, and valve 190 may be seen. The valve holder 150 may be seen disposed of inside of the circumferential projection of the valve cover 102. The valve may be seen disposed inside of the valve holder 150. As noted by FIG. 17, the valve holder 150 may be thermally welded (or heat sealed) in the valve assembly 100 such that it is gas tight. FIG. 18 shows a bottom view of the valve assembly 100. The circumferential depression 108 and aperture 106 may be seen in the base 104 of the valve cover 102. The aperture may be understood to allow for gas flow through the aperture into the cylindrical projection 112 housing the valve holder 150 and valve 190. The valve 190 may regulate the venting of such gasses from the aperture 106 through the valve 190 and out the cutout 158 of the valve holder 150. FIG. 19 shows a top view of the valve assembly 100, the circumferential projection 114 of the valve cover 102 housing the valve holder 150 and valve 190 extends upwards from the base 104.

The valve 190 may be held in place by pressure. For example, the valve 190 may be held in place by pressure between the valve holder 150 and valve cover 102. In various embodiments, the assembly 100 may allow for customization of compression. Compression may allow for variance as to when the valve 190 opens in response to pressure in the battery 202. For example, the ratio of the valve holder 150 to the valve cover 102 may facilitate adjustment of valve 190 operating range. The component dimensions may allow for compression variance—changing the tool may vary the compression of the valve 190. Variance of the compression of the valve 190 affects the opening of the valve. For example. to increase the opening pressure, closing pressure, and leak tightness, the compression of the valve 190 could be increased. In various embodiments, the disclosed assembly 100 may have a larger surface area than known assemblies where the valve holder 150 contacts the valve cover 102 between the assembly components. While the range may be customized, the disclosed valve assembly 100 may also advantageously result in less variability in the operating range of the valve 190 during use. The ratio may also prevent the valve holder 150 from being inserted too far into the assembly, which may result in a higher than desired opening pressure. The heightened surface area may prevent over-insertion by stopping the valve holder 150 when it is properly seated in the valve cover 102 with the valve 190. The ratio may also improve the robustness of the assembly process, making assembly less sensitive.

Valve Assembly with Cover Assembly

Figure 21:
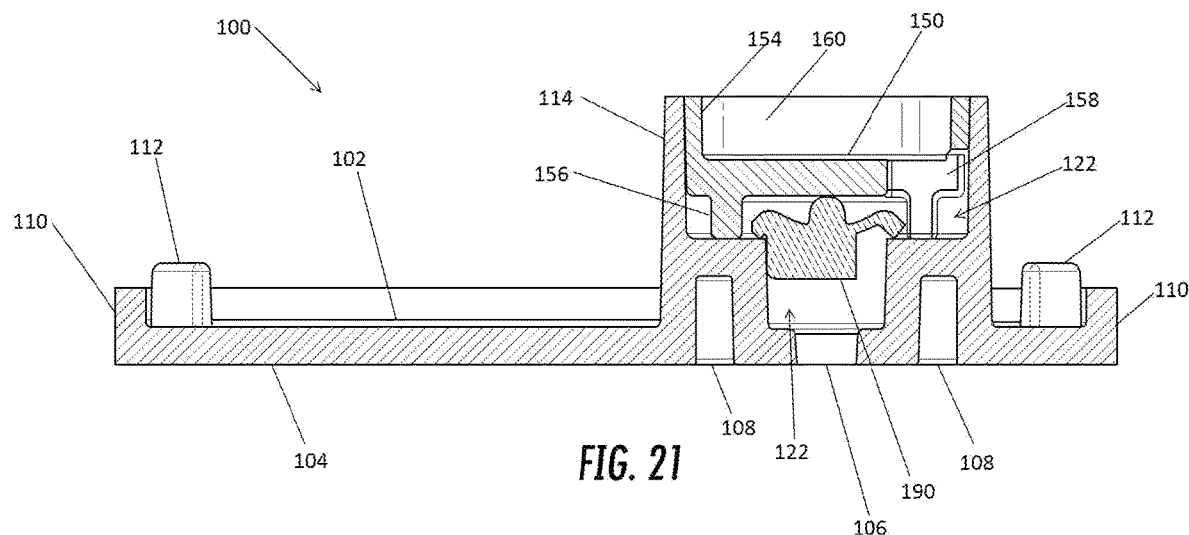
FIG. 21 shows a cross-section of a valve assembly, according to various embodiments.

In order to assemble the valve assembly 100, the valve 190 may be provided into the valve holder 150, which is inserted into the valve cover 102. This progression may be seen, in various embodiments, in FIG. 20. The valve 190 may be secured in place by the valve holder 150. The valve holder 150 and valve cover 102 may be heat welded or ultrasonically welded, although alternative assembly methods may also be acceptable. A cross section showing the seating of the valve 190 may be seen in FIG. 21. The valve may be seen disposed inside the valve cover 102 also within the valve holder 150.

Figure 22:
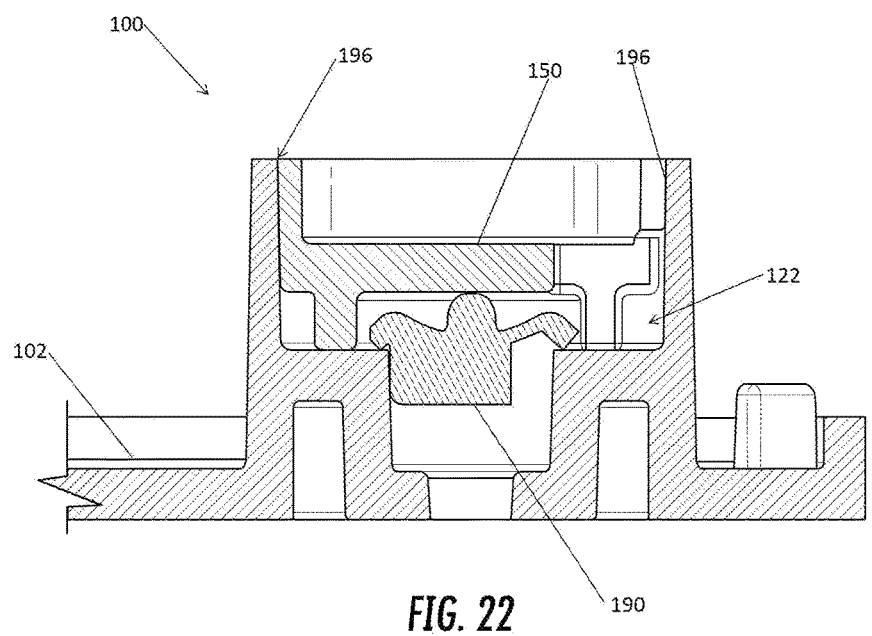
FIG. 22 shows a detail view of a cross-section of a valve assembly showing the valve seated within, according to various embodiments.
Figure 23:
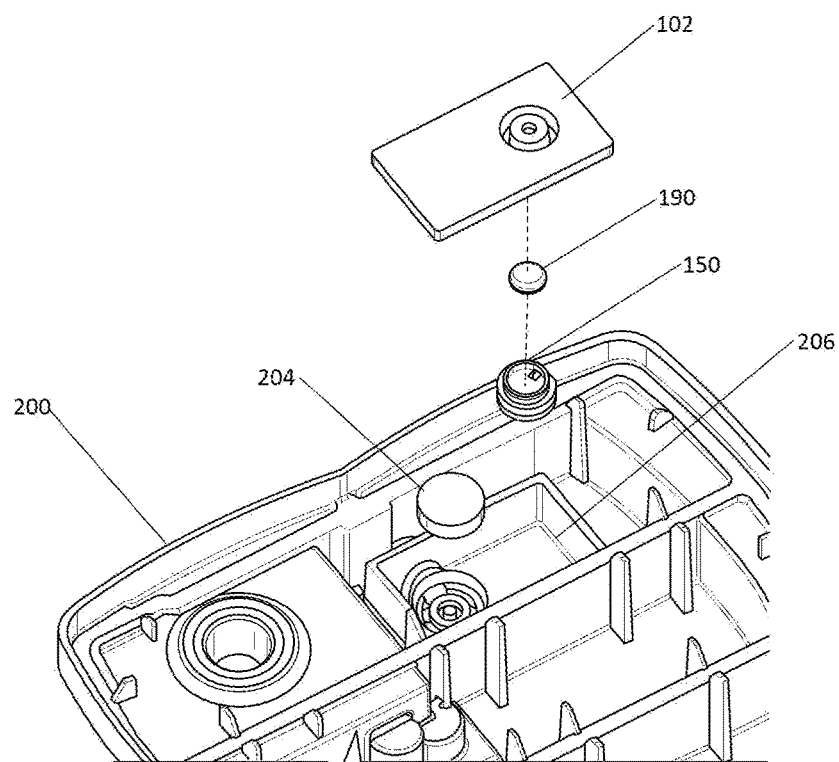
FIG. 23 shows a valve assembly provided within a battery cover, according to various embodiments.
Figure 24:
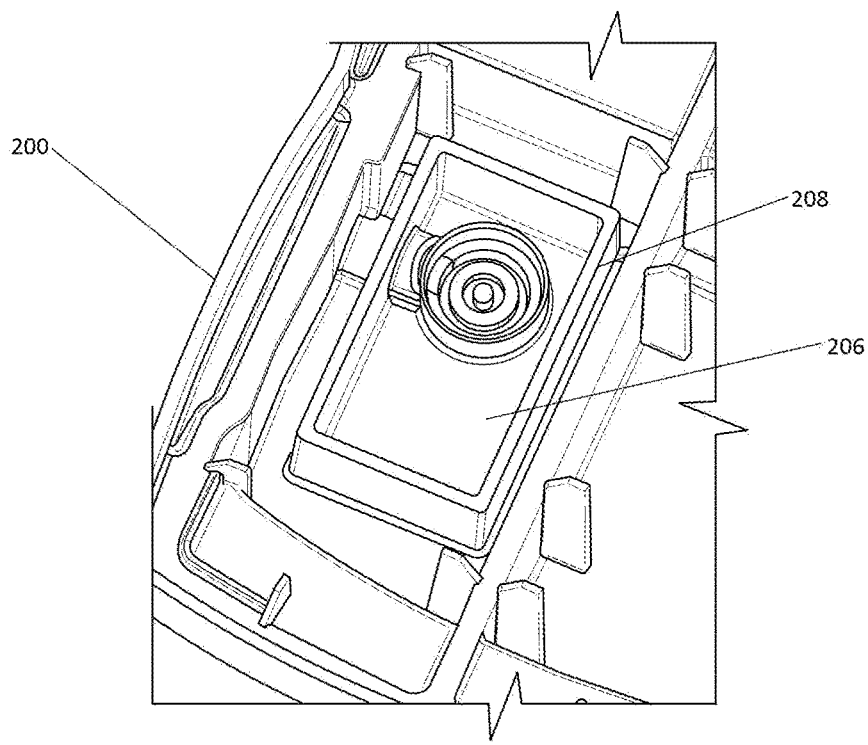
FIG. 24 shows a cover pocket for accepting a valve assembly in a battery cover, according to various embodiment&

FIG. 22 shows another step in the process, in which the perimeter 196 of the assembly 100 may be heat-sealed. Again, the valve 190 can be seen disposed of inside the valve holder 150 which is inside of the valve cover 102. FIG. 23 shows the progression of the insertion of the valve assembly 100 into a battery cover assembly 200. The entire battery cover assembly may comprise one or more flame arrestors 204 and valve assemblies 100. In various embodiments, the flame arrestor 204 may be heat sealed to the pocket 206 (a pocket may be provided for the assembly in the cover) and then the valve cover 102 may be heat sealed or ultrasonically welded. The heat sealed surface 208 may be seen in FIG. 24.

Figure 25:
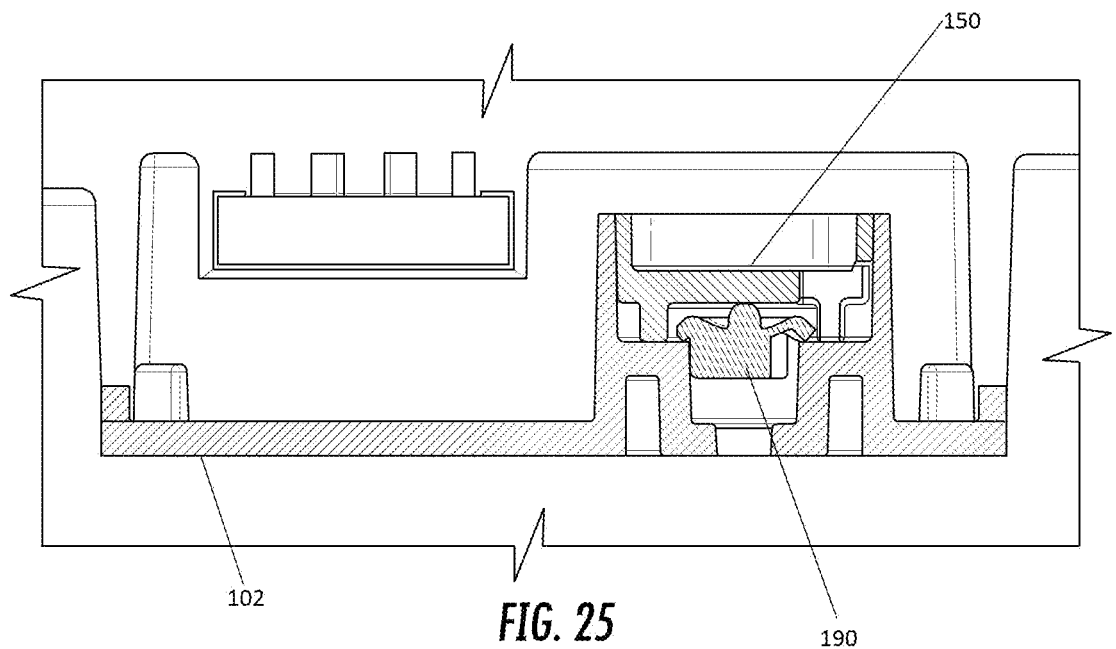
FIG. 25 shows a valve assembly provided in a battery cover, according to various embodiments.
Figure 26:
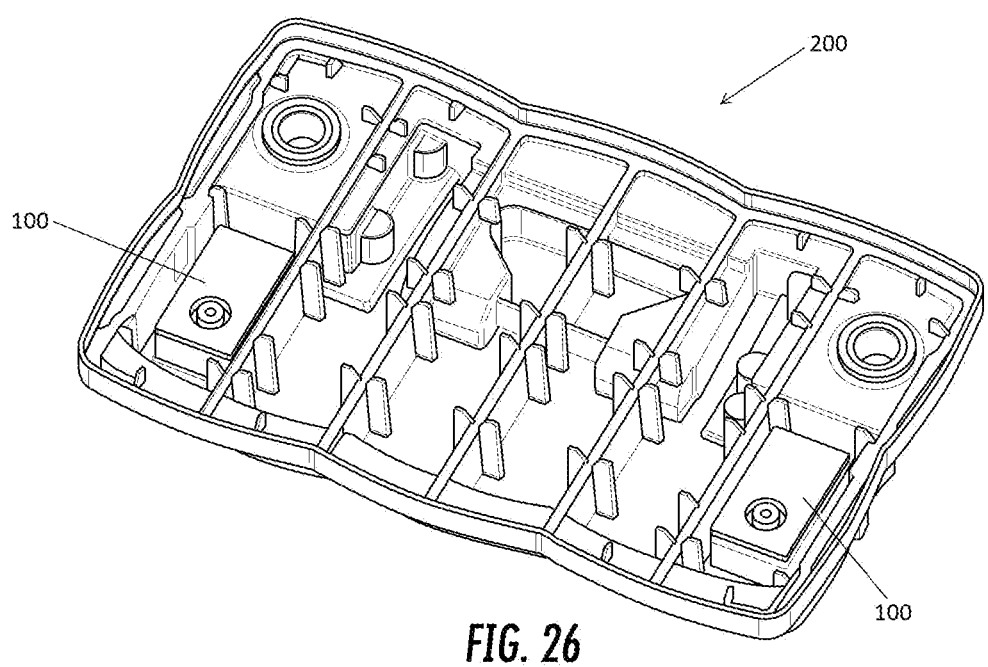
FIG. 26 shows multiple valve assemblies provided in a battery cover, according to various embodiments.
Figure 31:
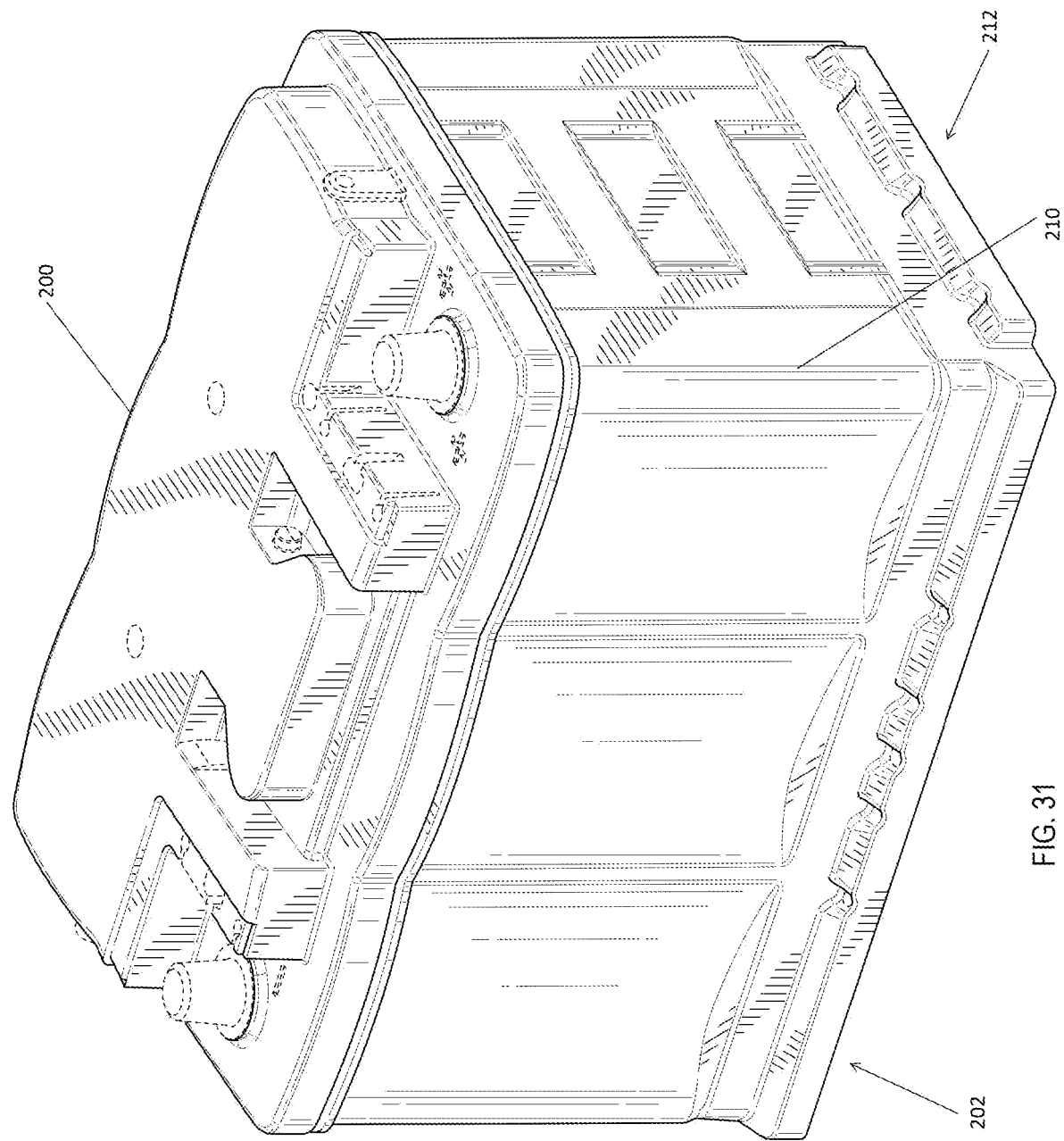
FIG. 31 shows a battery having a housing with a cover and operable battery elements which may be used with the disclosed valve assembly, according to various embodiments.

A cross-section of the assembly may be seen in FIG. 25. The valve assembly 100 may be seen disposed of within a cover. FIG. 26 shows a bottom view of a cover. A first and second valve assembly 100 may be seen on a first and second end of the cover. While the cover 200 is shown in a particular shape, it should be understood other cover 200 shapes and sizes, as well as positions of the valve assembly 100 are within the scope of this disclosure. The cover 200 may then be provided as part of a housing 210 containing operable battery elements 212 (see FIG. 31).

Figure 27:
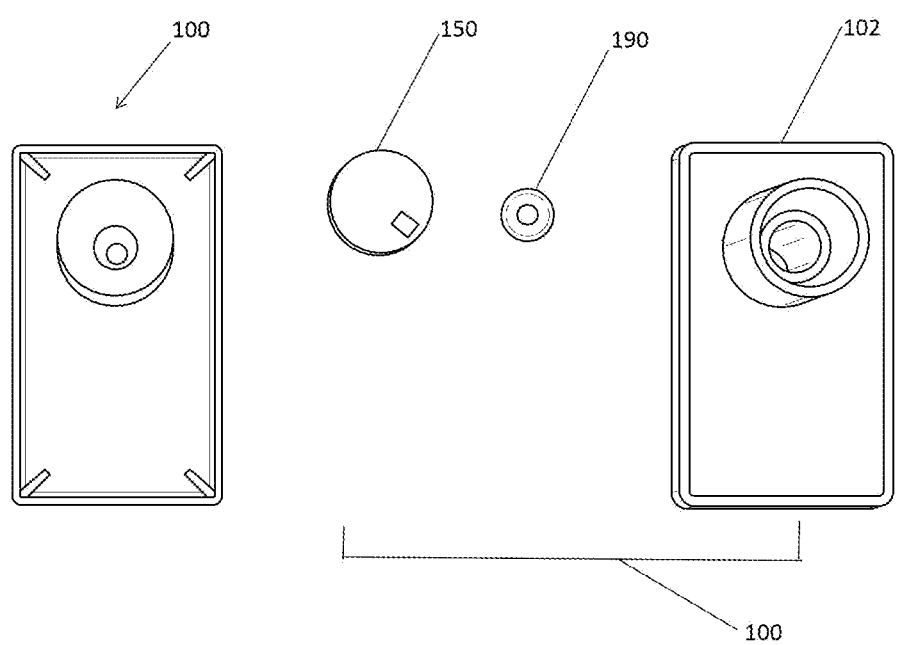
FIG. 27 shows valve assembly components and a valve assembly, according to various embodiments.

The valve cover 102, valve holder 150, valve, and assembled valve assembly 100 may be seen in FIG. 27. The valve cover 102, valve holder 150, and valve 190 may be seen both separately and assembled as shown on the right-hand side of FIG. 27.

Method of Testing

Figure 28:
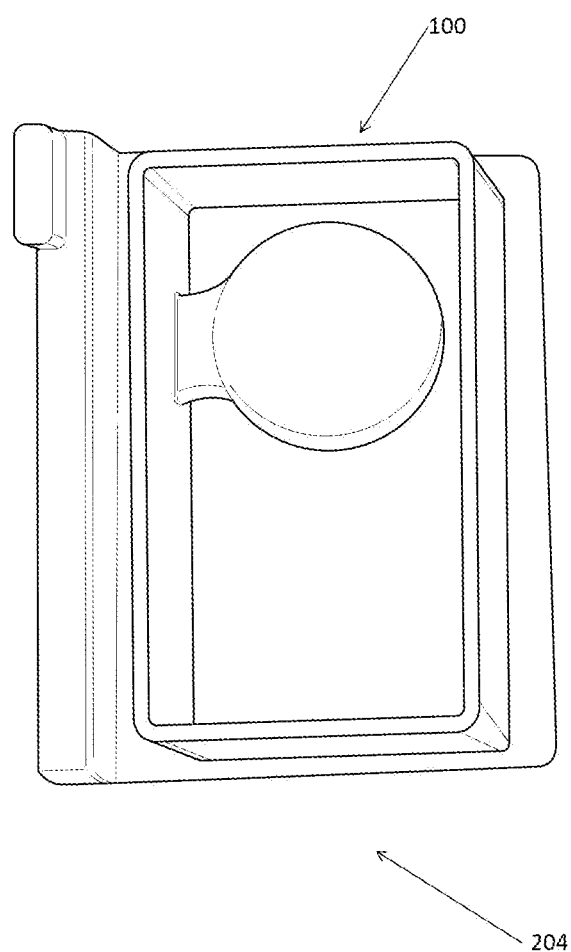
FIG. 28 shows a valve assembly provided in a cover section with a flame arrestor, according to various embodiments.
Figure 29:
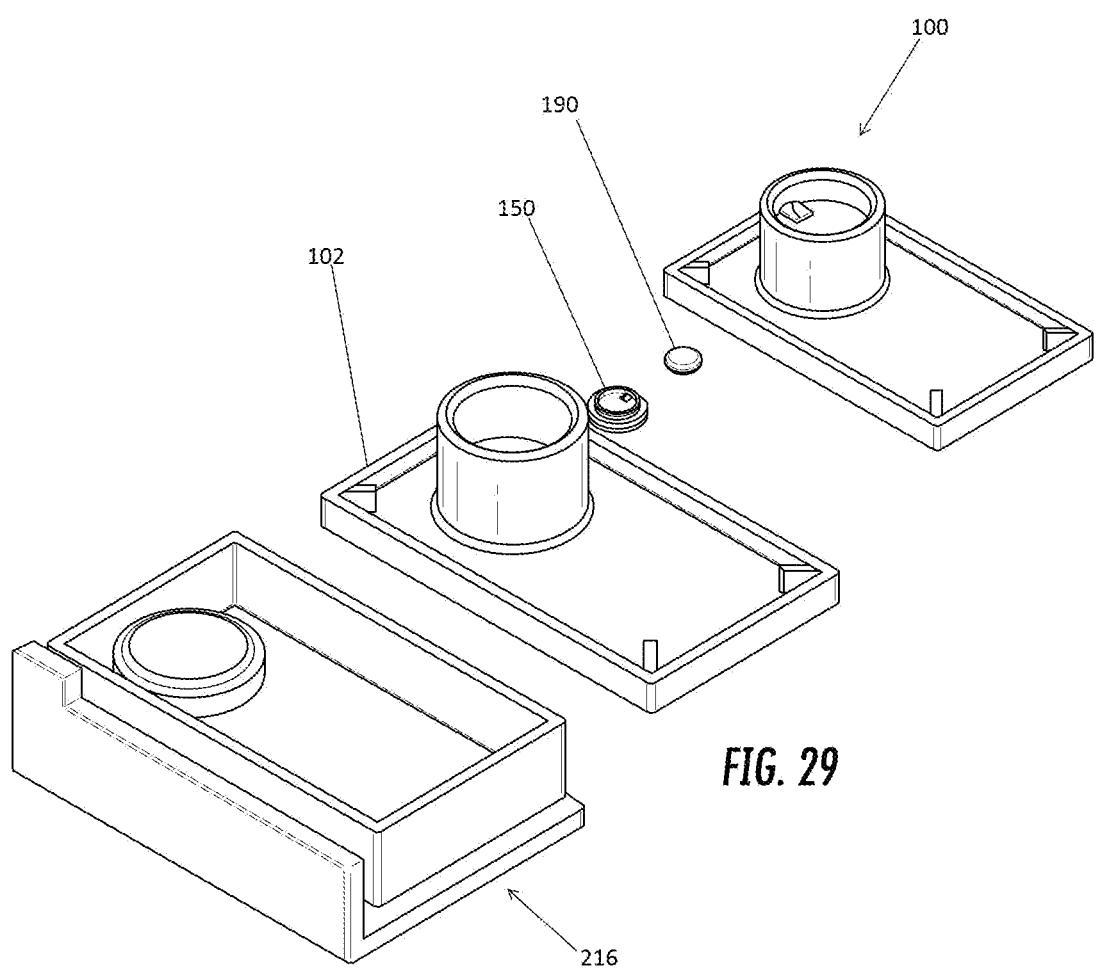
FIG. 29 shows valve assembly components and a valve assembly, as well as a valve assembly provided in a cover section, according to various embodiments.

The assembly may be tested using a battery cover section with a flame arrestor 204 heat sealed as shown in FIG. 28. This may be seen in connection with the valve assembly 100 separated out in FIG. 29. The flame arrestor 204 may be heat sealed to the cover 200. The valve holder 150 and valve cover 102 may be heat welded or ultrasonically welded. While specific methods of assembly are provided for purposes of example, variations thereon and alternatives thereto may also be acceptable.

The disclosed valve assembly 100 may advantageously allow for testing prior to installation in a battery cover 200. In various embodiments, the assembled valve assembly 100 (valve 190, valve holder 150, and valve cover 102) may be tested for performance. For example, the valve assembly 100 may be subject to a leak check and evaluated for opening pressure and closing pressure prior to installation in the battery cover 200. For example, this testing may be performed by blowing air through the assembly from above or below the valve. The testing may be performed, in various embodiments, after heat sealing of the valve holder 150 to the valve cover 102. The heat sealing or ultra-sonic welding may allow for the connection between the valve holder and valve cover to be gas tight. Once the three components are formed pressure checks may be performed. These checks may be performed with or without a flame arrester element 204 additionally provided with the valve assembly 100. Additional testing may be performed after the vent assembly 100 installation in the cover 200.

Figure 30:
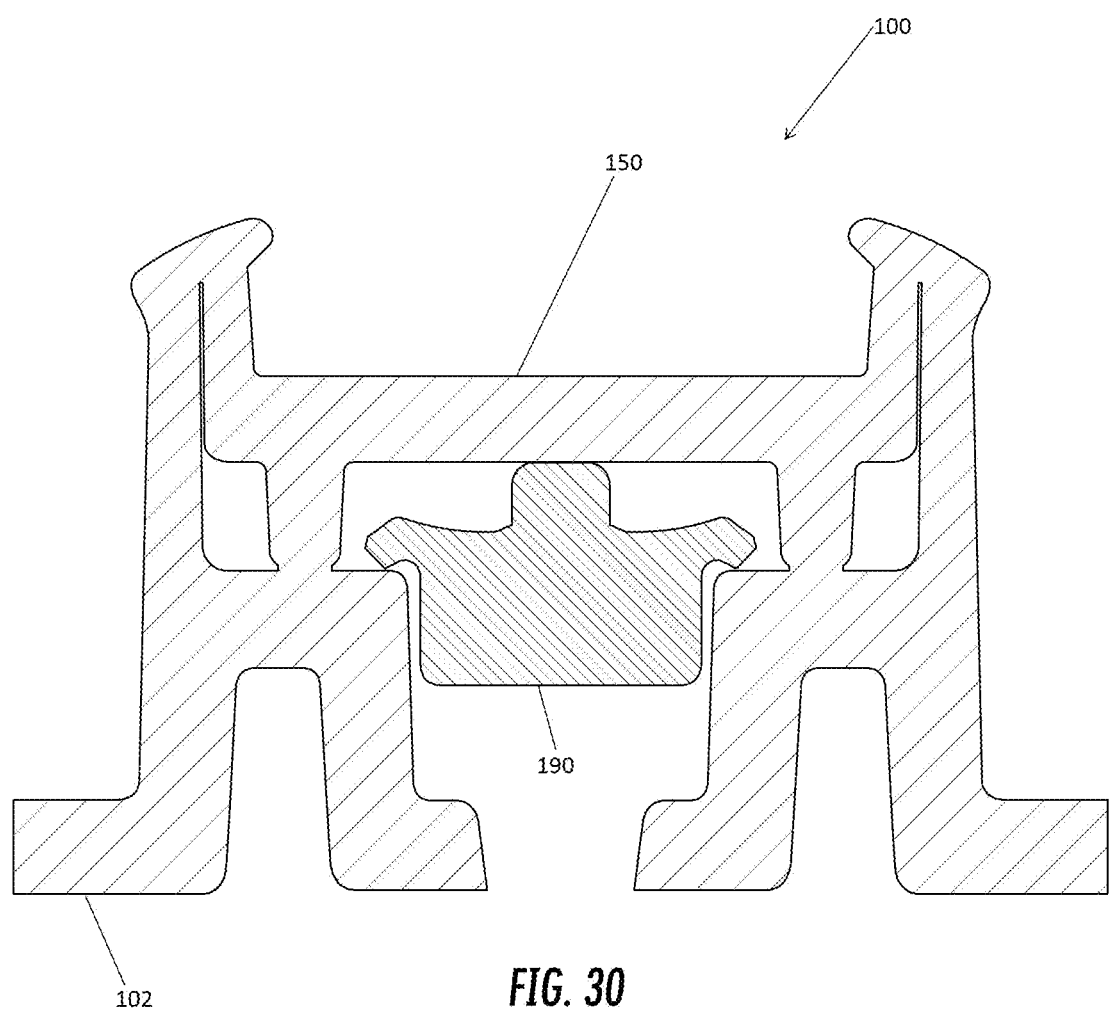
FIG. 30 shows a CT scan of a valve assembly, according to various examples of embodiments.

Looking to FIG. 30, the valve 190 is shown seated in the assembly 100 between the valve holder 150 and the valve cover 102. In various embodiments, as detailed above, the functionality of the valve 190 may be modified through compression of the valve within the assembly. This compression may be varied prior to heat-sealing. In other words, depending on the part tolerance and assembly the valve compression may change.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that references to relative positions (e.g., "top" and "bottom") in this description are merely used to identify various elements as are oriented in the Figures. It should be recognized that the orientation of particular components may vary greatly depending on the application in which they are used.

For the purpose of this disclosure, the term "coupled" means the joining of two members directly or indirectly to one another. Such joining may be stationary in nature or moveable in nature. Such joining may be achieved with the two members or the two members and any additional intermediate members being integrally formed as a single unitary body with one another or with the two members or the two members and any additional intermediate members being attached to one another. Such joining may be permanent in nature or may be removable or releasable in nature.

It is also important to note that the construction and arrangement of the system, methods, and devices as shown in the various examples of embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied (e.g. by variations in the number of engagement slots or size of the engagement slots or type of engagement). The order or sequence of any process or method steps may be varied or re-sequenced according to alternative embodiments. Other substitutions, modifications, changes and omissions may be made in the design, operating conditions and arrangement of the various examples of embodiments without departing from the spirit or scope of the present inventions.

While this invention has been described in conjunction with the examples of embodiments outlined above, various alternatives, modifications, variations, improvements and/or substantial equivalents, whether known or that are or may be presently foreseen, may become apparent to those having at least ordinary skill in the art. Accordingly, the examples of embodiments of the invention, as set forth above, are intended to be illustrative, not limiting. Various changes may be made without departing from the spirit or scope of the invention. Therefore, the invention is intended to embrace all known or earlier developed alternatives, modifications, variations, improvements and/or substantial equivalents.

The technical effects and technical problems in the specification are exemplary and are not limiting. It should be noted that the embodiments described in the specification may have other technical effects and can solve other technical problems.

The invention claimed is:

1. A valve assembly for a battery cover, the valve assembly comprising:
   a valve cover having a base with an aperture in fluid communication with an internal chamber defined by a cylindrical projection coupled to the base;
   a valve provided in the internal chamber;
   a valve holder, with a holder cylindrical projection and a holder base, provided in the internal chamber; and
   the holder cylindrical projection and the holder base having a side cutout.

2. The valve assembly of claim 1, wherein the base features a circumferential depression.

3. The valve assembly of claim 2, wherein the aperture is provided at least proximate to a center of the circumferential depression.

4. The valve assembly of claim 1, wherein the valve assembly may be tested prior to installation on the battery cover.

5. A battery cover having the valve assembly of claim 1.

6. A battery having the battery cover of claim 5.

7. A battery comprising:
   a housing having operable battery elements;
   a battery cover on the housing having a recess sized to accept a valve assembly;
   a valve assembly having a valve cover, a valve, and a valve holder;
   the valve cover comprises a cylindrical projection and an aperture, with the aperture in fluid communication with an internal chamber defined by the cylindrical projection;
   the valve holder, having a valve holder cylindrical projection extended from a base, with a side cutout; and
   the valve holder positioned within the internal chamber.

8. The battery of claim 7, wherein the aperture has a first radius in fluid communication with the internal chamber defined by the cylindrical projection, the cylindrical projection has a second internal radius and a third internal radius, with the first radius being smaller than the second radius, which is smaller than the third radius.

9. The battery of claim 8, wherein the valve holder is provided in a section of the internal chamber having the third radius.

10. The battery of claim 8, wherein a portion of the valve extends into an area in the internal chamber having the second radius.

11. The battery of claim 7, wherein the valve is provided between the valve holder and the cylindrical projection.

12. The battery of claim 11, wherein the valve is positioned between the valve holder and the cylindrical projection in the internal chamber in an area having a radius.

13. The battery of claim 7, wherein the valve cover has a base with the cylindrical projection and a circumferential depression.

14. The battery of claim 13, wherein the aperture is at least proximate to a center of the circumferential depression.

15. A valve assembly for a battery cover, the valve assembly comprising:
   a valve cover having a base coupled to a cylindrical projection and having an aperture, wherein the cylindrical projection has an internal surface, the internal surface defining an internal chamber, wherein the aperture is in fluid communication with the internal chamber of the cylindrical projection;

a valve holder, comprised of a holder cylindrical projection and a valve holder base having a side cutout, provided within the cylindrical projection of the valve cover; and a valve provided between the valve holder and valve cover, with the valve assembly being positioned for a test prior to installation on the battery cover.

16. The valve assembly of claim 15, wherein the valve cover is in communication with the internal surface in an area of the cylindrical projection having a first radius.

17. The valve assembly of claim 15, wherein the valve cover comprises a base, with a circumferential depression being defined by the base.

18. The valve assembly of claim 17, wherein the valve holder base has a first side and a second side opposite the first side, with the valve holder base being coupled to a cylindrical body on the first side, and coupled to the cylindrical projection on the second side.

19. A battery cover comprising the valve assembly of claim 15.

20. A battery comprising the battery cover of claim 19.

* * * * *